No. 670,898. Patented Mar. 26, 1901.
F. C. ESMOND.
UNIT MULTIPLE SYSTEM OF TRAIN CONTROL.
(Application filed Apr. 10, 1900.)
(No Model.)
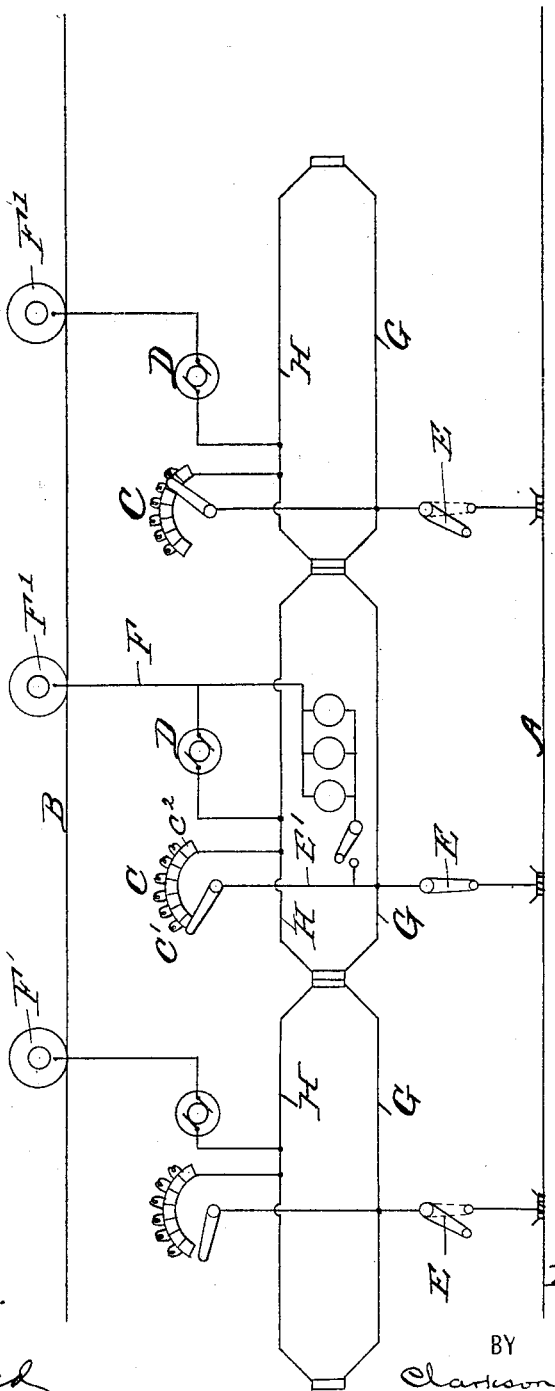
WITNESSES:
INVENTOR
F. C. Esmond
BY
Clarkson A. Collins
HIS ATTORNEY

UNITED STATES PATENT OFFICE.

FREDERICK C. ESMOND, OF BROOKLYN, NEW YORK, ASSIGNOR TO ESMOND ELECTRIC TRACTION AND SIGNAL CO., OF WEST VIRGINIA.

UNIT-MULTIPLE SYSTEM OF TRAIN CONTROL.

SPECIFICATION forming part of Letters Patent No. 670,898, dated March 26, 1901.

Application filed April 10, 1900. Serial No. 12,386. (No model.)

*To all whom it may concern:*

Be it known that I, FREDERICK C. ESMOND, a citizen of the United States, residing in the borough of Brooklyn, county of Kings, city and State of New York, have invented certain new and useful Improvements in Unit-Multiple Systems of Train Control, of which the following is a specification.

My invention relates to a unit-multiple system for electric railways—that is, a system in which a train of cars may be controlled from any car of the train independently of the individual controlling system of every other car in the train. I will describe such a system involving my invention and then point out the novel features in the claims.

In the drawings, Figure 1 is a diagrammatic view of the wiring of a car and the position of the controller on the car from which the train is controlled and before starting. Fig. 2 is a diagrammatic view of a portion of the wiring of a car of the train, the switch between the supply-conductor and car being open. Fig. 3 is a diagrammatic view of a portion of the wiring in a car of the train under control of the car shown in Fig. 1, the motor being connected with the controlled circuit and independent of a controller on the same car.

Similar letters of reference refer to corresponding parts in all the figures.

A represents a trolley-wire or other form of electrical conductor, and B a ground or return, which in this instance is a rail.

C represents a controller, and D a motor which is carried by the car. The current is received from the supply A through switch E and conductor E' to the controller-arm, then from the positive side C' of the controller out through the negative side C², through the motor D to ground B, through conductor F and wheel F' of the car.

In addition to the parts above referred to, which show the ordinary way of supplying current to a motor, I provide the conductors G and H, which preferably extend from end to end of the car. The conductor G is connected with the conductor E', so that when the switch E is closed it contains current, while the conductor H is connected with the negative side C² of the controller and preferably forms part of the circuit between the negative side of the controller and motor. Each car is provided as above described, and when the cars are coupled the adjacent ends of the conductors G and H on each car are coupled, so that (assuming that the switches E of all the cars of the train are open with the exception of one) current will be in the conductor G in all the cars, but cannot be supplied to the conductor H in the several cars except through a controller. For example, assume that the drawings represent three cars which are coupled together and the conductors G and H also coupled, with only one switch E (that of Fig. 1) closed between the supply-conductor A and conductor G. The current will then pass through the switch E to the conductor G and will thus be in all the cars. As soon, then, as the controller-arm is moved the current in the conductor G will pass into the conductor H and then into all the motors to the ground or return. This is accomplished, it will be seen, by having the controllers on each car in parallel between the conductors G and H, so that the current which is always maintained in the conductor G will have to pass through some one controller before it can reach the conductor H, which is connected or forms part of the motor-circuit in each car. The motors are also in this instance in parallel between the conductor H and ground or return B.

Should anything occur to render the controller on the controlling-car of the train inoperative, the current will be shut from all the motors of the train and cannot be supplied again except through another controller. Should anything occur to the circuit between the supply and conductor G on the controlling-car, the current may be supplied by closing the switch E on another car.

Although the switches E E E have been described as normally in open position, the preferred position would be closed, as thereby the conductor G, extending through the train, would have better connection with the working conductor—that is to say, should any one of the conductors make poor contact with the working conductor A it would not affect the continuous flow of current to the motors, as the conductor G from which the motor-current is derived has by the said preferred arrangement several connections with the working conductor other than the one by which poor contact has been hypothecated, and by the plurality of such connections a perfect contact with the working conductor is assured.

I do not describe or claim herein the system of train-lighting shown in the drawings, as I have made the same the subject of a separate application for Letters Patent, filed June 2, 1900, Serial No. 18,880.

While I have described and illustrated my invention in connection with the operation of railway-trains, to which it is particularly adapted, it will be evident that it is usefully applicable to the operation of any similar set or series of motors or groups of motors which it may be desired to synchronously control from any one of separated points, and I wish it understood that the claims are intended to apply to and cover the system of motor control wherever motors may be located.

What I claim as new is—

1. The combination with a pair of conductors extending through a train, of a controller on each car interposed between said conductors, substantially as described.

2. The combination with a pair of conductors extending through a train, one of which contains current, of a controller on each car, interposed between said conductors, one of said conductors being connected with the positive side of the controller and the other with the negative side of the controller, substantially as described.

3. The combination with the motors of a train, of a pair of conductors provided through said train, one of which contains current and the other of which is connected with the motor, and a motor-controller on each car or a multiple number of the cars, which is interposed between the said conductors, substantially as described.

4. The combination of a series of cars each of which is provided with a motor, and a pair of conductors, one of said conductors containing current and the other connected with the motor-circuit on its car, an electrical connection between the said conductors and a motor-controller on each car interposed between said conductors, substantially as described.

5. The combination with a pair of conductors extending through a car, one of which contains current, of a motor carried by the car and connected with the other of said conductors and a controller between said conductors and in series with the motor, substantially as described.

6. The combination of a series of cars coupled together, each or a multiple number of which is provided with a pair of conductors and a motor which is connected with one of the conductors, said conductors being also coupled throughout the train, a supply-conductor, an electrical connection on each car between said supply-conductor and one of the pair of conductors, and a switch in each of of said connections, substantially as described.

In testimony whereof I have signed my name to this specification in the presence of two subscribing witnesses.

FREDERICK C. ESMOND.

Witnesses:
H. COUTANT,
C. A. COLLINS.